Oct. 23, 1962    A. W. WISEMAN    3,060,352
GAGING APPARATUS
Filed April 6, 1959
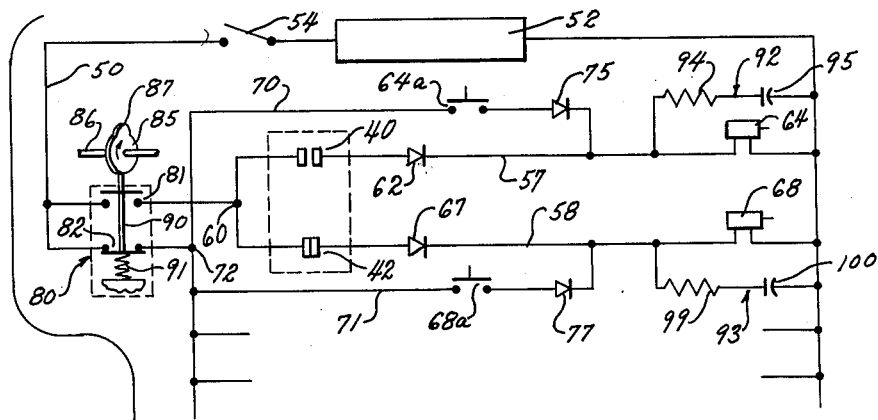
FIG.1
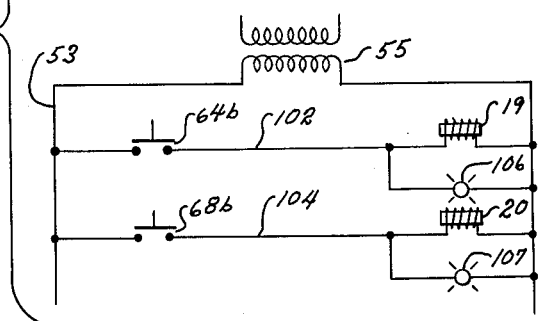
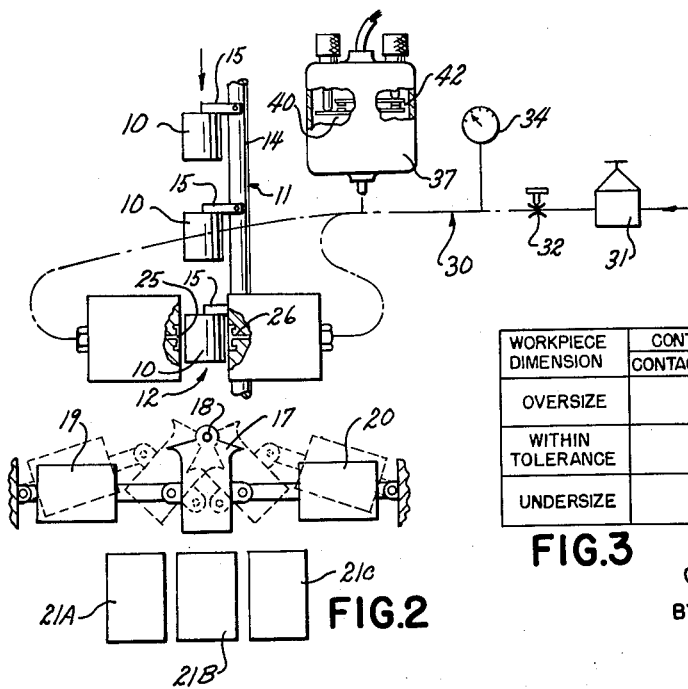
FIG.2
| WORKPIECE DIMENSION | CONTACT CONDITION | | CONTAINER |
|---|---|---|---|
| | CONTACTS 42 | CONTACTS 40 | |
| OVERSIZE | X | O | 21A |
| WITHIN TOLERANCE | O | O | 21B |
| UNDERSIZE | O | X | 21C |
FIG.3
INVENTOR
Arthur W. Wiseman
BY
Ernest J. Hix
ATTORNEY :::::::::::::::::::::::::::::::::::::::::::::::::::::::::::::::::::::::::::::
United States Patent Office 3,060,352
Patented Oct. 23, 1962

3,060,352
GAGING APPARATUS
Arthur W. Wiseman, Dayton, Ohio, assignor to The Sheffield Corporation, Dayton, Ohio, a corporation of Delaware
Filed Apr. 6, 1959, Ser. No. 804,334
10 Claims. (Cl. 317—154)

This invention relates to electrical apparatus and more particularly to an improved electrical control system especially adapted for use in machine tools, gaging machines and the like.

In machine tools, gaging machines and the like wherein a complex operating cycle is carried out it is common practice to include electrical control and actuating systems. Ordinarily these systems receive signals of machine positions, gaging results and other necessary information, and then through signal circuits act to obtain the actuations and operative results required.

As an example, in gaging machines switch actuations are obtained in gaging circuits in response to measured dimensions and signal relays are controlled thereby. It is necessary for the circuit to receive this information and retain it even after a workpiece has moved from gaging position so that it can later be segregated or marked in accordance with its dimension.

Components such as relays in alternating current systems have inherently shorter lives than in direct current systems. In prior known systems it has been necessary to use relay controlled contacts in every gaging circuit to "read-out" the signal at the proper moment to the signal relays and isolate the relays at other times to prevent spurious signals. Also in prior systems of this character a complex cycle control switching arrangement has been necessary to read-in or receive information and retain it. After each gaging it has been prior practice to completely reset the entire circuit to a reference condition before the next gaging operation—resulting in nonproductive operations of circuit components.

It is accordingly a basic object of this invention to provide an electrical control system especially adapted for use in gaging machines which is simple and involves fewer operating components than previously required, makes possible longer effective life of operating components, and achieves a more rapid and efficient operating cycle.

It is a further object to provide such a system which is energized by direct current for longer life of components, and where complex read-in switching arrangements are avoided through cooperation of a minimum number of circuit switches and unidirectional current control means such as diodes to prevent the completion of spurious or leaking signal circuits within the system.

It is a further object to provide such a system which is conditioned to receive the gaging signal and hold it through the simple operation of a double throw switching arrangement to one position and return, thus materially reducing the cycle control equipment previously required.

It is a further object to provide such a system which does not require "resetting" between each gaging operation, circuit conditions remaining the same if sequential gaging conditions are unchanged, and in effect simultaneously "resetting" and "reading-in" if the condition changes between any two gaging operations.

Other objects and advantages of the invention will be apparent from the following description, the appended claims, and the accompanying drawing, in which, FIGURE 1 is a diagram of an electrical gaging system embodying the present invention, FIGURE 2 is a schematic showing of an exemplary workpiece transfer and gaging apparatus which can be used with the circuit of FIGURE 1, and FIGURE 3 is a chart of certain switch contact conditions in the circuit of FIGURE 1.

In the illustrated embodiment provided for purposes of disclosing the present invention a pneumatic gaging apparatus measures dimensions of workpieces sequentially fed to it and actuates input switches provided in parallel gaging circuits. Holding circuits are provided for retaining the gaging signals. A cycle controlling double throw switch unit having a first switch to the gaging circuits and a second switch to the holding circuits is actuated from a holding position to gaging position, and return to complete the gaging cycle wherein the signal is received and retained. If sequential gaging conditions are the same, circuit conditions are not changed. If the gaging conditions change between any two sequential gaging operations, then the new signal is read-in or received simultaneously as the circuit is reset and the previous signal drops out. Direct current energization is provided for the maximum life in operating components. This direct current energization in cooperation with certain unidirectional current control elements eliminates numerous contacts and controlling relays previously required for such an operation. Signals determined by input conditions to the direct current control system result, in this example, in actuations of components in alternating current output circuits.

Referring more particularly to the drawing, FIGURE 2 is a pneumatic gaging apparatus provided to illustrate schematically an exemplary application of the system of FIGURE 1. Workpieces 10 are sequentially transferred to and from a gaging station 12 by a transfer device 11. Transfer device 11 includes a rod 14 which is cyclically rotated and reciprocated endwise in a conventional manner to bring transfer fingers 15 forward for transfer, following which they are raised to clear the workpieces and returned to their previous positions. After gaging, each workpiece 12 is transferred from the gaging station into a movable chute 17 pivoted at 18 and actuated to one side or the other by respective solenoids 19 and 20 to distribute the workpieces into one or the other of three containers 21A–C depending upon their size classifications.

Gaging station 12 includes opposed leakage orifices 25 and 26 at one end of a pneumatic gaging circuit 30 supplied with air under pressure through regulator 31 and adjustable restriction 32. Pressure gage 34 indicates the pressure within circuit 30 which varies with the gaged dimension of the workpiece interposed between orifices 25 and 26 in a conventional manner.

The resulting pressures are effective on a transducer unit 37 which can be similar to that illustrated and described in detail in U.S. Patent No. 2,878,334, issued March 17, 1959. Such a unit includes switch contacts such as those shown at 40 and 42 which are opened or closed at selected tolerance limits in the dimension of workpieces 10. In this example contacts 42 close for an oversize workpiece, contacts 40 close for an undersize workpiece, and if the workpiece is within tolerance limits both sets of contacts are open.

Thus the input condition to the electrical system of FIGURE 1 is determined by input switch means 40 and 42 actuated in accordance with the workpiece dimensions. Control system 50 of FIGURE 1 is energized from a direct current power source 52 and includes a master control switch 54. At the lower portion of FIGURE 1 is an alternating current actuating circuit 53 energized through transformer 55. Input signals to direct current control circuit 50 through contacts 40 and 42 result in energization of actuating means in circuit 53 such as solenoids 19 and 20.

Parallel gaging circuits 57 and 58 extend from a common connection at 60. Gaging circuit 57 includes series from common connection 60, input switch contacts 40, a unidirectional current control element 62 and a signal relay 64. In circuit 58 switch means 42, control element 67 and relay 68 are similarly provided. In each instance control elements 62 and 67 can be provided by an electrical component such as a diode phased to allow current flow toward the respectively relay as indicated but restricting flow in the reverse direction.

A similar number of parallel holding circuits 70 and 71 are also provided, one for each signal relay 64, leading from a common connection 72. Circuit 70 includes, in series from common connection 72, a set of holding contacts 64a controlled by relay 64 and a unidirectional control element 75 allowing current flow through holding circuit 70 to its respective gaging circuit 57 at the point of connection therewith between element 62 and relay 64.

Holding circuit 71 similarly includes holding contacts 68a controlled by relay 68 and a unidirectional current control element 77 which is similarly phased to allow flow only toward its respective gaging circuit.

A cycle control means is provided through switch unit 80 shown as a single pole double throw unit providing a first switch 81 to the common 60 for the gaging circuits and a second switch 82 leading to common connection 72 for the holding circuit. Switch unit 80 is actuated in timed relation with transfer 11 by a cam 85 on shaft 86 rotated from a common drive with the transfer. Cam 85 includes a projection 87 for momentarily depressing actuator 90 of switch unit 80. Spring 91 returns actuator 90.

As shown, switch 82 is closed to the holding circuits. With master switch 54 closed, signal relay 68 would be energized through switch means 42 to close contacts 68a and 68b, completing the holding circuit to the relay and energizing solenoid 20. In any gaging cycle as shaft 86 rotates, projection 87 depresses actuator 90 to first open holding switch 82 and immediately thereafter close gaging switch 81 to "read-in" or receive the new input condition. Immediately thereafter as shaft 86 continues its rotation actuator 90 returns to its previous condition, first opening switch 81 and then closing switch 82 to the holding circuits to retain the signal.

It will be appreciated that momentarily during the operation of actuator 90 in either direction both switches 81 and 82 are open. To retain the signal for this moment during transition of switches 81 and 82 from one condition to the other delay circuits 92 and 93 are provided in parallel with relays 64 and 68. Delay circuit 92 includes resistor 94 and capacitor 95. Resistor 99 and capacitor 100 are similarly in parallel to relay 68. These delay circuits 90 and 91 not only serve to maintain the respective energized signal relay in an energized condition during the momentary opening of both switches 81 and 82 in a cyclic operation but they also serve for arc suppression.

Alternating current energized actuating circuit 53 includes parallel circuits 102 and 104 controlled by the respective relays 64 and 68 for energization of solenoids 19 and 20. FIGURE 3 illustrates the conditions of contacts 40 and 42 in response to the workpiece dimensions. It also shows the manner in which selecting chute 17 is swung from one side to the other, or maintained in a neutral position, by solenoids 19 and 20 in the actuating circuit. Signal lights 106 and 107 which are in parallel to the respective solenoids 19 and 20 respectively signal the undersize and oversize conditions of the workpieces.

A cyclic operation is carried out upon a single rotation of cam 85 to depress actuator 90 and allow its return so that a signal is momentarily read-in to control circuit 50 as a workpiece 10 is properly positioned at station 12 and circuit 30 is in a stabilized condition. Assume that master switch 54 is closed and that the previous gaged workpiece was oversized with contacts 68a closed along with actuating contacts 68b as previously described.

If on the subsequent gaging operation switch contacts 40 were closed and contacts 42 open the following would occur. First, holding switch 82 would open and then gaging switch 81 would close, energizing relay 64 through closed contacts 40. Simultaneously holding contacts 64a would be closed in circuit 70. Contacts 64b would be closed to solenoid 19. Relay 68 is kept momentarily energized through delay circuit 93 for a full movement of actuator in one direction but it then deenergizes and contacts 68a, 68b open, as actuator 90 immediately returns upward to close switch 82 to the holding circuits 70 and 71. Relay 64 is maintained in an energized position through its respective delay circuit 92 during this movement and then, as switch 82 is closed, a circuit is completed through holding circuit 70 and contact 64a for holding relay 64 in its energized condition.

If upon the second gaging operation switch contacts 42 had remained closed they would have retained that position due to the momentary delay provided by circuit 93. Upon a full reciprocation of switch actuator 90 the contact conditions in circuit 50 would have been unchanged. Thus when the gaging signal remains the same the circuit is effectively undisturbed except for the actuation of unit 80 and unnecessary switch movements are avoided. However, if circuit conditions are reversed due to a change in the workpiece dimension the new input condition is simultaneously received as the circuit is reset and the other signal drops out.

Upon energization of solenoid 19 chute 17 is swung to the left as seen in FIGURE 2 and the previously gaged workpiece goes into container 21A after it is removed from station 12 by transfer 11.

Projection 87 operates to receive the gaging information at precisely the right time in the coordinated operation with the workpiece properly positioned and gaging circuit stabilized. During other periods it is possible that spurious signals will be provided and that both input switch contacts 40 and 42 may be simultaneously closed.

After a proper gaging input signal has been received through closing of one set of contacts 40 or 42 and has been held as above described, unidirectional current control elements 62 and 67 operate to avoid the completion of a circuit from one gaging circuit to the other if both pairs of contacts in unit 37 were closed to provide a spurious signal. These unidirectional control elements 62 and 67 are directed to prevent series current flow from a completed holding circuit through any pair of gaging circuits upon simultaneous energization of contacts or switch means 40, 42. For example, with holding switch 82 closed and relay 68 energized following receipt of a proper gaging signal, if both switch means 40 and 42 were later accidently closed a circuit would be prevented from completion from holding circuit 71, through the left portion of gaging circuit 58, and through gaging circuit 57 to relay 64. Thus through direct current energization provided by source 52 and the use of elements 62 and 67 spurious signals are avoided without the necessity for complex controlling relays and contacts to read-in the signal and then isolate the gaging and holding circuits.

Unidirectional current control elements 75 and 77 in respective holding circuits 70 and 71 are directed to prevent series current flow through any pair of the holding circuits from a completed one of gaging circuits 57 and 58. During movement of actuator 90 in unit 80 down and return it is possible through the momentary delay provided by circuits 90 and 91 that both sets of holding contacts 64a and 68a may be simultaneously closed for an instant prior to the dropping out of one. With the selected one of switch means 40 and 42 closed to receive the signal it would be possible, were it not for control elements 75 and 77, that a circuit could be completed through its respective holding circuit, the holding circuit for the other of the gaging circuits, and to the other relay so that the previous signal could not be dropped out. However, through the provision of elements 75 and 77 a previously energized one of signal relays 64 and 68 can be effectively deenergized upon a change in the gaging condition.

Any number of holding circuits and gaging circuits can be paralleled from a single switch unit 80 with similar actuating circuits being provided energized from source 55.

Thus it is seen that an extremely simple and reliable electrical control system has been provided. Through the basic operation of a double throw switch from one position to the other and return a complete gaging cycle is completed including the reading-in of the desired information and the retaining of it. Direct current energization provides maximum life for the operating components and in association with the unidirectional control means of the circuit eliminates the necessity for complex controlling relays and switches operative to momentarily pick up the signal and otherwise isolate the circuit. Any number of holding and gaging circuits can be controlled from a single switch unit without the necessity of providing a large number of control relays when other circuits are provided. The circuit conditions are not disturbed if sequential gaging operations provide the same results and economy of operation and lengthened component life is thus achieved. If gaging conditions do change in sequential operations the new signal is effectively read-in as the old is dropped out or the circuit is reset for maximum speed of operation.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. An electrical system for receiving and retaining signals provided by switch means operated in response to an input condition, said system comprising a plurality of gaging circuits each including input switch means and signal means controlled thereby, a holding circuit for each signal means including holding contacts closed in response to energization of the respective signal means, cycle control means including a first switch for said gaging circuits, a second switch for the holding circuits and actuating means operative in each gaging cycle to open said second switch and immediately thereafter close said first switch to receive the input signal provided by said input switch means and for then opening said first switch and immediately thereafter closing said second switch for holding the received signal, delay means for each of signal means for maintaining the respective signal means energized and holding contacts closed during transition of said first and second cycle controlling switches from one condition to the other while both switches are simultaneously open and a power source for said gaging and holding circuits through the switches of said cycle control means.

2. An electrical system as set forth in claim 1 wherein said cycle control means includes a single pole, double throw switch unit providing said first and second switches, actuated from a holding position, to gaging position, and return for a complete gaging cycle.

3. An electrical system for receiving and retaining signals provided by switch means operated in response to an input condition, said system comprising a plurality of gaging circuits each including input switch means and signal means controlled thereby, a holding circuit for each signal means including holding contacts closed in response to energization of the respective signal means, cycle control means including a first switch for said gaging circuits, a second switch for the holding circuits and actuating means operative in each gaging cycle to open said second switch and immediately thereafter close said first switch to receive the input signal provided by said input switch means and for then opening said first switch and immediately thereafter closing said second switch for holding the received signal, delay means for maintaining closed holding contacts in a closed condition during transition of said first and second controlling switches from one condition to the other, and a gaging power source providing direct current energization for said gaging and holding circuits through the switches of said cycle control means.

4. An electrical system as set forth in claim 3 further including a plurality of alternating current energized output circuits, each of said output circuits having contacts operatively connected to and actuated by a respective one of said signal means.

5. An electrical system as set forth in claim 3 further comprising unidirectional control means in each of said gaging circuits directed to prevent series current flow from a completed holding circuit through any pair of gaging circuits upon simultaneous closing of the respective switch means, whereby false energization of said signal means upon fluctuations of the input condition are avoided.

6. An electrical system as set forth in claim 3 further comprising unidirectional current control means in each of said holding circuits directed to prevent series current flow through any pair of holding circuits from a completed gaging circuit, whereby a transmission of current from a completed gaging circuit, through portions of the respective holding circuits, and to a previously energized signal means is prevented to allow drop-out of the signal means upon change in the input condition to the system.

7. A direct current electrical system for receiving and retaining signals provided by switch means operated in response to an input condition, said system comprising a plurality of gaging circuits each including input switch means and signal means controlled thereby, a holding circuit for each signal means including holding contacts closed in response to energization of the respective signal means, cycle control means including a single pole, double throw switch unit providing a first switch means to said gaging circuits and a second switch means to said holding circuits, and means for actuating said switch unit from a first holding position with said second switch means closed to a gaging position with said first switch means closed and return for a complete cycle, delay means in parallel to each signal means for momentarily maintaining the respective signal means energized during transition of said first and second switch means from one condition to the other as both switch means are open, and a gaging power source providing direct current energization for said gaging and holding circuits through the switch means of said switch unit.

8. A direct current electrical system for receiving and retaining gaging signals provided by input switch means operated in the response to a dimension or other product characteristic, said system comprising a plurality of parallel gaging circuits having a common connection and each including, in order, input switch means, unidirectional current control means, and a relay in series, said unidirectional current control means being directed for current flow in each instance toward the respective relay, a first controlling switch in series with said common connection to the gaging circuits, a corresponding plurality of parallel holding circuits having a common connection at one end and each connecting to a respective one of said gaging circuits between the respective unidirectional current control means and relay, each of said holding circuits including in order from the common connection a set of holding contacts closed upon energization of the respective relay and unidirectional current control means directed for flow of current toward the respective gaging circuit, a second controlling switch in series with the common connection to said parallel holding circuits, actuating means operative in each gaging cycle to open said second switch and immediately thereafter close said first switch to receive the input signal provided by said input switch means and for then opening said first switch and immediately thereafter closing said second switch for holding the received signal, a resistor-capacitor circuit around each of said relays to maintain the respective relay energized during movement of said controlling switches from one position to the other as both switches are momentarily open, and a gaging power source providing direct current energization for said gaging and holding circuits through said controlling switches.

9. An electrical system for receiving and retaining input signals provided by switch means operated in response to a gaged workpiece dimension or the like, said system comprising a plurality of parallel gaging circuits each including gage controlled switch means and a signal relay controlled thereby, a holding circuit for each relay including holding contacts operated thereby, cycle control means including a first switch connected in common to said gaging circuits, a second switch connected in common to said holding circuits, cycle controlling means for actuating said first and second switches between a receiving condition with said first switch closed and said second switch open and a holding condition with the switch conditions reversed, means providing direct current energization for said gaging and holding circuits through said first and second switches, a plurality of parallel output circuits, means providing alternating current energization for said output circuits, each of said signal relays including controlling contacts in a respective one of said output circuits, and output means in each of said output circuits controlled by the respective set of relay operated contacts, whereby energization of a relay within a direct current gaging circuit results in energization of an output means in a respective one of said alternating current output circuits.

10. An electrical system for receiving and retaining signals provided by switch means operated in response to a gaged workpiece dimension or the like, said system comprising a plurality of parallel gaging circuits each including gage controlled switch means and a relay controlled thereby, a holding circuit for each relay including holding contacts operated thereby, cycle control means including a first switch connected in common to said gaging circuits, a second switch connected in common to said holding circuits, and actuating means operative in each gaging cycle to open said second switch and immediately thereafter close said first switch to receive the input signal provided by said input switch means and for then opening said first switch and immediately thereafter closing said second switch for holding the received signal, a resistor-capacitor circuit in parallel to each of said relays for maintaining each respective relay energized during transition of said controlling switches from one condition to the other as both switches are momentarily open, means providing direct current energization for said gaging and holding circuits through said first and second switches, a plurality of parallel output circuits, means providing alternating current energization for said output circuits, each of said relays including controlling contacts in a respective one of said output circuits, and output means in each of said output circuits controlled by the respective set of relay operated contacts, whereby energization of a relay within a direct current gaging circuit results in energization of an output means in a respective one of said alternating current output circuits.

References Cited in the file of this patent

UNITED STATES PATENTS

| | | |
|---|---|---|
| 2,512,639 | Gohorel | June 27, 1950 |
| 2,530,749 | Yardeny | Nov. 21, 1950 |
| 2,570,716 | Rochester | Oct. 9, 1951 |
| 2,593,958 | Aller | Apr. 22, 1952 |
| 2,892,132 | Mallory | June 23, 1959 |